May 3, 1966 E. J. SCHUBERT 3,249,690

VIDEO QUANTIZER PRODUCING BINARY OUTPUT SIGNALS AT INFLECTION POINTS OF INPUT SIGNAL

Filed Nov. 13, 1961 4 Sheets-Sheet 1

INVENTOR.
ERNEST J. SCHUBERT
BY
Samuel B. Stone
ATTORNEY

*INVENTOR.*
ERNEST J. SCHUBERT
*BY* Samuel B. Stone
ATTORNEY

*INVENTOR.*
ERNEST J. SCHUBERT
*BY* Samuel B. Stone
ATTORNEY

INVENTOR.
ERNEST J. SCHUBERT
BY
Samuel B. Stone
ATTORNEY

United States Patent Office 3,249,690
Patented May 3, 1966

3,249,690

VIDEO QUANTIZER PRODUCING BINARY OUTPUT SIGNALS AT INFLECTION POINTS OF INPUT SIGNAL

Ernest J. Schubert, La Puente, Calif., assignor to Beckman Instruments, Inc., a corporation of California Filed Nov. 13, 1961, Ser. No. 151,859
13 Claims. (Cl. 178—6.8)

This invention relates to data processing and, more particularly, to a method and an apparatus for processing video information into a form more susceptible of accurate transmission.

Frequently it is necessary to transmit video information indicative of a full range of grey shades in addition to video information indicative of black and white shades. A scanning device, such as a photoelectric scanner, may read printed or handwritten characters, photographs, or generate signals from objects, cloud formations, etc., for subsequent transmission to a recorder. In many cases, it is desirable to transmit video signals representing the indicia on a document or a photograph, objects, or clouds directly to a remote facsimile recorder without producing an intermediate copy or record. These video signals frequently contain a full scale of grey levels representing details in an analog form, and require linear transmission channels or the grey levels may be lost thereby providing an inaccurate record.

Accordingly, it is an object of the present invention to process video information of the above nature in a manner so that the indicia of pertinent grey levels and certain minor details are made more significant to facilitate transmission thereof.

An additional object of the present invention is the provision of a data processing apparatus which operates upon video signals indicative of a range of greys to provide binary or relatively black and white representations in lieu of the range of greys.

A further object of the present invention is the provision of an apparatus for processing signals containing indicia of grey shades, which provides binary output signals representative of certain minor changes in grey shades as well as binary output signals representative of major changes in grey shades.

A still further object of the present invention is the provision of an apparatus for processing video signals indicative of a range of grey shades, which senses the points of inflection for the video signals to provide binary output signals.

Another object of this invention is to sense the points of inflection of signals representative of shades of grey and to provide binary output signals upon the occurrence of each point of inflection.

According to the present invention, video signals may be obtained either from a scanning device by means of a photoelectric transducer or from any other sensing device. The video signals are analog signals indicative of various grey shades as well as black and white shades. The analog video signals are converted into binary signals representing significant details. Such binary signals are easily transmitted over channels with nonlinear characteristics, and they may be reproduced by simple and reliable recorders in black and white plots. In an illustrative embodiment of this invention, the analog video signals are amplified and then applied to a differential analog amplifier which generates the first derivative of the signals. A first channel computes the absolute value of the first derivative, after which a switching function is generated, i.e., an output pulse of a fixed width and magnitude is generated upon the occurrence of each absolute value signal. A second channel obtains the second derivative of the analog video signals, computes the absolute value of the second derivative and generates a switching function in response thereto. The switching function signals from both channels are applied to a gate. The gate provides an output signal when the absolute value of the first derivative is greater than zero and simultaneously the absolute value of the second derivative is zero or nearly zero. A point of inflection is defined by the first derivative being non-zero while the second derivative is zero. Hence, the video signals are processed to determine each point of inflection, and to provide output signals of a constant magnitude and width representative of the points of inflection. The output signals are representative of major (light and dark) as well as minor (changes in shades of grey) details. These output signals represent all details (major and minor) as black and white indicia which are more readily transmitted. The output signals are amplified and transmitted to a recorder which is operated in synchronism with the scanning device.

Other features and objects of the invention will be better understood from a consideration of the following detailed description when read in conjunction with the attached drawings in which.

Figure 1:
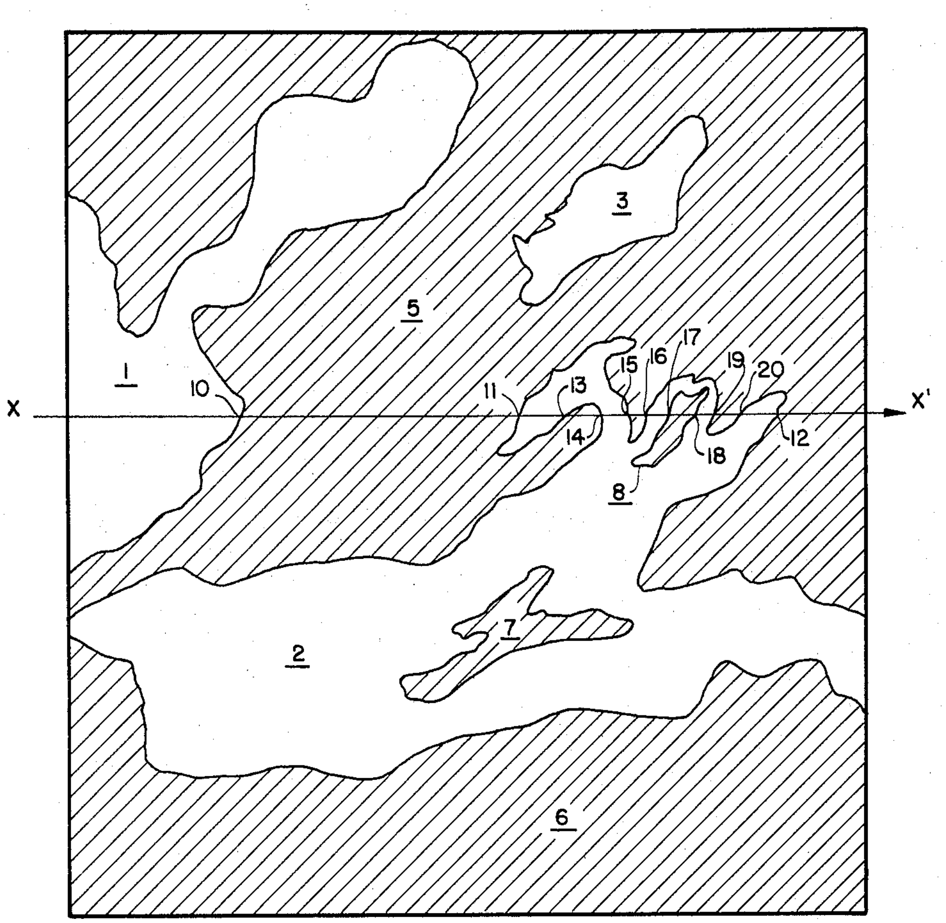
FIG. 1 is a graphical representation of a photograph containing minor and major changes in grey shades.

Referring now to the drawings, FIG. 1 illustrates an image or a photograph containing minor and major changes in grey shades as well as light and dark shades, which is to be scanned and subsequently transmitted. This image may be, for example, a photograph of clouds wherein light areas 1, 2 and 3 indicate clouds, and the cross-hatched areas 5, 6, 7 and 8 indicate substantially clear (dark) areas. An image of this nature may be obtained, for example, with a television camera or other photosensitive apparatus in a conventional manner to provide a video signal for transmission and subsequent coversion to a nephanalysis (a plot describing cloud formations). The line X–X′ is indicative of a single scan.

Figures 2A, 2B, 2C, 2D, 2E, 2F:
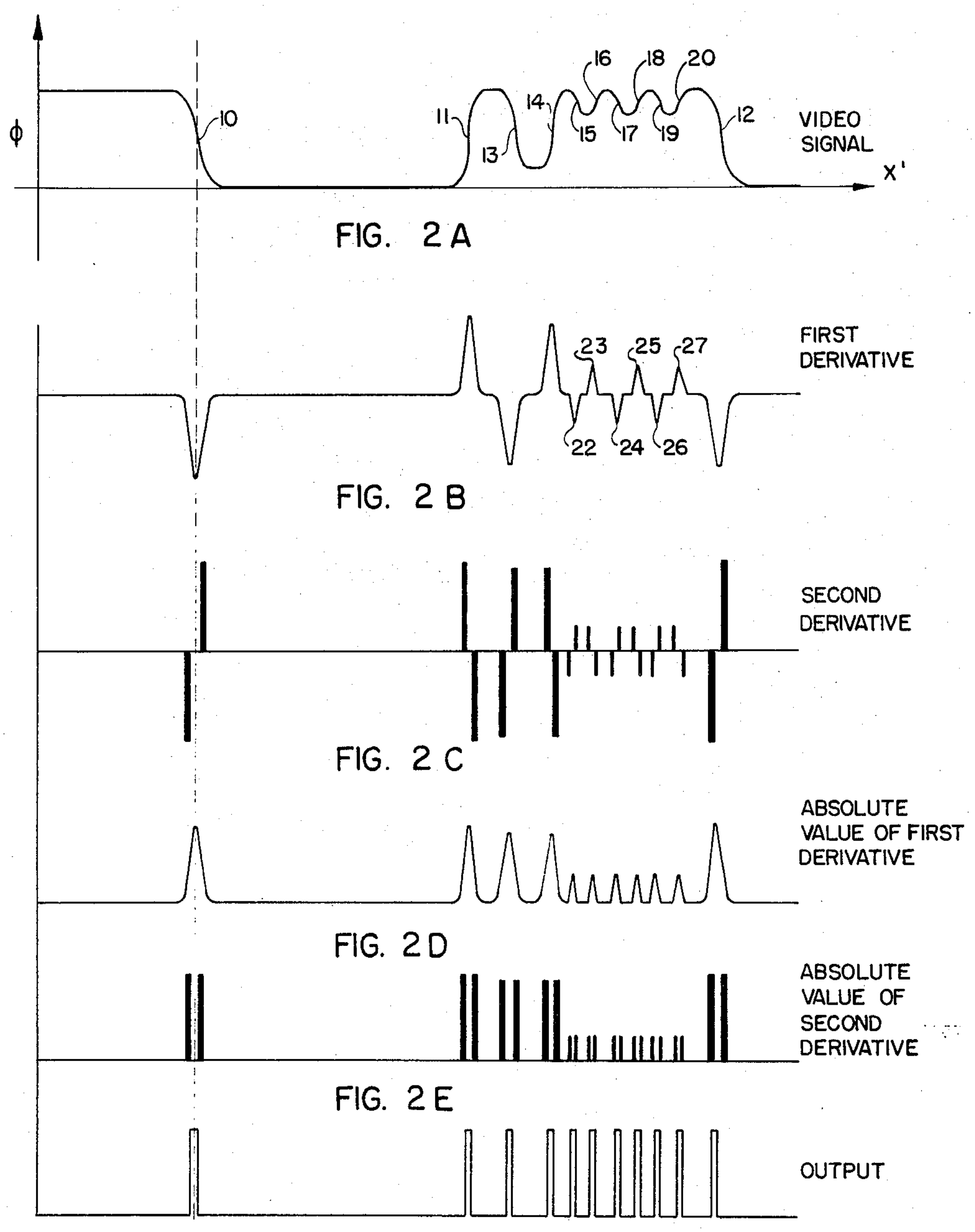
FIG. 2A illustrates a signal obtained by scanning the line X–X′ of FIG. 1.
FIGS. 2B through 2F show signals which illustrate the processing of the signal shown in FIG. 2A.

FIG. 2A indicates the video signals having changes in light intensity $\phi$ produced by scanning the line X–X′ in FIG. 1. Referring to the scan line X–X′ and the video signal illustrated in FIG. 2A, it can be seen that the cloud area 1 from the left edge of the image or photograph along line X–X′ to a point 10 is substantially white, and the clear area 5 along line X–X′ is substantially dark between the point 10 and a point 11. An area exists between the point 11 and a point 12 which includes whites and shades of grey. The area along line X–X′ subsequently returns to dark from the point 12 to the right edge of the image. This area between the points 11 and 12 includes minute changes in grey shades which may be lost in a nonlinear transmission system.

The reference numerals employed to designate points along the scan line X–X′ in FIG. 1 also are utilized to designate the corresponding points on the video signal illustrated in FIG. 2A. As can be seen from FIGS. 1 and 2A, the area between the points 11 and 12 on the scan line X–X′ is light between points 11 and 13, dark grey between points 13 and 14, and light between points 14 and 15. The image or photograph is light grey between points 15 and 16, points 17 and 18, and points 19 and 20, whereas it is light between points 16 and 17, points 18 and 19, and points 20 and 12. Hence, it now should be apparent that by scanning the line X–X′ in FIG. 1 with a photosensitive apparatus a video signal as illustrated in FIG. 2A is produced which is indicative of the light and dark areas as well as the different grey areas along the line X–X′. The sharp changes between light and dark at the points 10, 11 and 12 provide well defined changes over a small increment on the X–X′ axis in the amplitude of the video signal. The changes at the points 13 and 14 are reasonably sharp, whereas the changes at the points 15 through 20 are not.

FIGS. 2B through 2F illustrate the processing operations performed on the video signal in FIG. 2A to obtain the ultimate output signals for transmission. According to a feature of this invention, the points of inflection of the video signal in FIG. 2A are sensed and employed to control the generation of constant width and constant magnitude output signals. In an analytical sense, a point of inflection is defined by the first derivative being nonzero while the second derivative is zero. Accordingly, the first derivative of the video signal is produced, and it is illustrated in FIG. 2B. Although the peaks of the first derivative signals are substantially round or curved, these signals are illustrated as sharp pulse spikes for convenience of illustration. The first derivative pulses corresponding to the minor details, or grey areas, between the points 15 and 20 in FIG. 1 are illustrated as relatively short pulses 22 through 27 in FIG. 2B. The variations in the video signal between the points 15 and 20 are relatively insignificant and would be lost in transmission. Likewise, the pulses 22 through 27 are relatively insignificant and also would be lost in transmission. Mere amplification of these pulses would not aid in their transmission since other signals, such as noise, also may be amplified to a significant level.

The second derivative pulses are shown in FIG. 2C as heavy solid lines for convenience of illustration. Subsequently, the absolute value of the first derivative is computed and it is illustrated in FIG. 2D. In a similar manner the absolute value of the second derivative is derived as shown in FIG. 2E.

The absolute values of the first and second derivatives are utilized to control the generation of switching function signals which are subsequently logically operated upon to provide the ultimate output signals. Each pulse in the output signal has a constant magnitude and width. An output pulse is produced when the absolute value of the first derivative is greater than zero and the absolute value of the second derivative is zero or nearly zero. The output signals are illustrated in FIG. 2F, and it should be noted that the grey levels as well as the light and dark levels indicated in the video signal in FIG. 2A are represented with equal significance by the output signals shown in FIG. 2F. Hence, the grey levels and minor details are made more pronounced to arrive at output signals which provide binary or substantially black and white representations of the areas scanned. Such binary signals are more readily transmitted, to a recorder, and the changes in grey levels will be replaced by a black line.

Figures 3A, 3B, 3C, 3D, 3E, 3F:
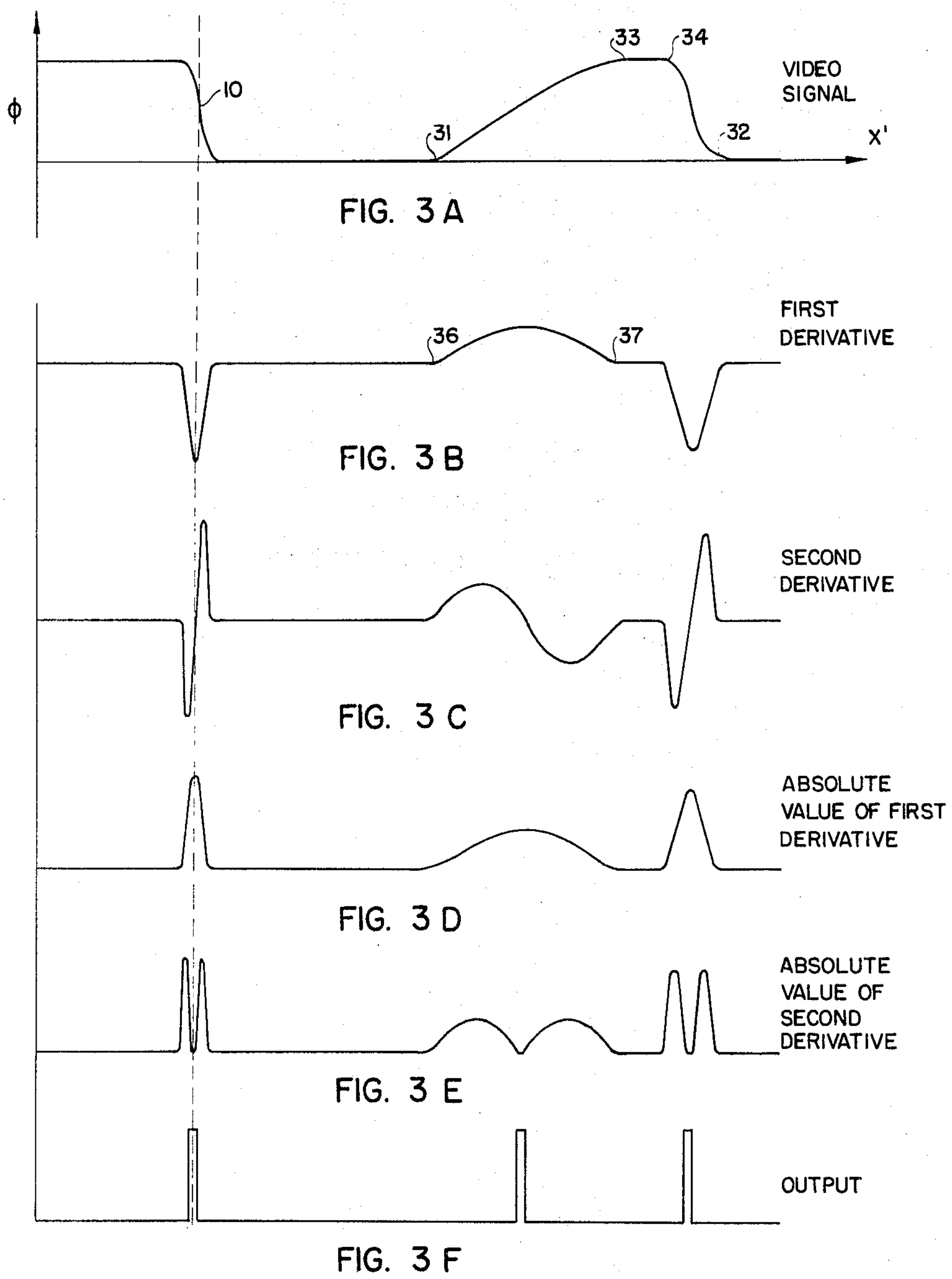
FIGS. 3A through 3F are waveforms further illustrative of the concepts of the present invention.

FIGS. 3A through 3F are waveforms which further illustrate the concepts of the present invention. A video signal is illustrated in FIG. 3A, and this signal may be obtained by scanning the line X–X′ shown in FIG. 1. However, it is assumed that the density between the points 11 and 12 in FIG. 1 changes relatively smoothly as illustrated between points 31 and 32 in FIG. 3A. FIG. 3A further illustrates a light area between points 33 and 34. The density changes rather slowly from dark to light between the points 31 and 33, and relatively fast from light to dark between the points 34 and 32. The first derivative of the video signal in FIG. 3A is illustrated in FIG. 3B. The first derivative of the portion of the video signal between the points 21 and 33 is illustrated between the points 36 and 37 in FIG. 3B. As can be seen, the curve between the points 36 and 37 does not provide a well-defined signal of significant change in grey level for transmission to a recorder, and, more than likely, such a signal would be lost in transmission. Accordingly, the second derivative is derived as illustrated in FIG. 3C, and the absolute values of the first and second derivatives are obtained as is illustrated in FIGS. 3D and 3E, respectively. The absolute value signals illustrated in FIGS. 3D and 3E are employed to generate switching function signals which are logically combined to provide the output signals illustrated in FIG. 3F. As can be seen in FIG. 3F, the changes in grey levels as well as the dark and light levels are adequately represented.

Figure 4:
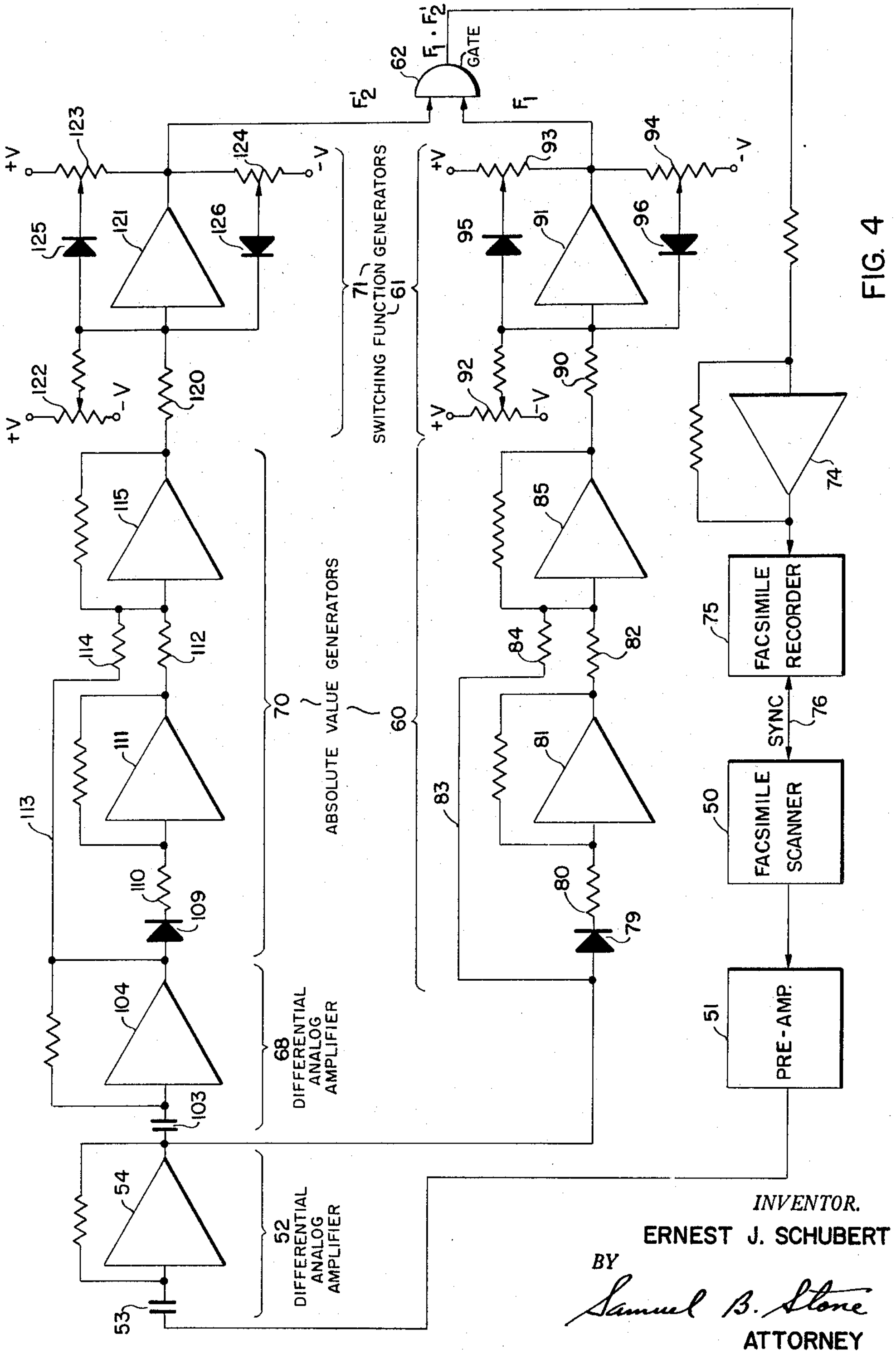
FIG. 4 is a block diagram of an illustrative data processing apparatus constructed in accordance with the teachings of the present invention.

FIG. 4 shows an exemplary circuit for processing video signals in the manner previously discussed to prevent the loss of definition of the grey levels contained in the video signals. A scanner, such as a facsimile scanner 50, may include a photosensitive device (not shown) which is utilized to scan photographs, documents, and the like. A television camera may be used in place of the scanner 50 to provide video signals representing objects, clouds, etc. if desired. The output from the scanner 50 is amplified by a preamplifier 51 and applied to a differential analog amplifier 52. The differential analog amplifier 52 includes a capacitance 53 and an operational amplifier 54. The differential analog amplifier 52 generates the first derivative of the video signals applied from the preamplifier 51. The output from the differential analog amplifier 52 is applied to a first channel including an absolute value generator 60 and a switching function generator 61. The output of the switching function generator 61 is applied to a gate 62. The absolute value generator 60 computes the absolute value of the first derivative of the video signal and supplies its output to the switching function generator 61. In response to the absolute value signals (which may vary in amplitude and width), the switching function generator 61 generates output binary signals each having a fixed magnitude and width.

The output of the differential analog amplifier 52 also is applied to a second channel including a differential analog amplifier 68, an absolute value generator 70, and a switching function generator 71. The output from the switching function generator 71 is in binary form and is applied to the gate 62. The signal from the switching function generator 61 may be termed signal $F_1$, and this signal is a binary ONE only when the absolute value of the first derivative is greater than zero, and a binary ZERO otherwise. The output from the switching function generator 71 may be termed signal $F_2'$ which is a binary ZERO if the absolute value of the second derivative is greater than zero, and a binary ONE otherwise (i.e., a ONE when the absolute value of the second derivative is zero, or nearly zero). The gate 62 provides an output signal when both the signals $F_1$ and $F_2'$ are ONES. The signals from the gate 62 are amplified by an operational amplifier 74 and applied to a recorder, such as a facsimile recorder 75. The scanner 50 and the recorder 75 are synchronized in operation in a conventional manner as illustrated by the sync line 76. The facsimile unit, for example, may be an Interfax unit made by the Western Union Telegraph Co., New York 13, New York.

As noted previously, the first derivative of the video signal is applied to the absolute value generator 60. Depending upon its polarity, the first derivative signal is applied either through a first path including a diode 79, a resistance 80, an amplifier 81, and a summing resistance 82 to an amplifier 85, or through a second path including a line 83 and a summing resistance 84 to the amplifier 85 in a conventional manner. These two paths serve to provide signals of one polarity to the amplifier 85. For example, a positive signal is inverted by the amplifier 81 in the first path and applied to the amplifier 85 as a negative signal, and a negative signal is applied without inversion through the second path to the amplifier 85. The output from the amplifier 85 is applied through a resistance 90 to an amplifier 91 in the switching function generator 61. A bias level potentiometer 92 which sets the bias level for switching is connected to the input of the amplifier 91. The potentiometer 92 is connected between positive and negative potential sources +V and −V, respectively. The switching function generator 61 includes potentiometers 93 and 94, and feedback diodes 95 and 96. The potentiometers 93 and 94 set the level at which the respective diodes 95 and 96 conduct, and hence, set the levels of the resulting output signals (binary ONES and ZEROS). The switching function generator 61 is constructed and operated in a conventional manner to provide output signals of a fixed amplitude and width in response to input signals of varying amplitudes and widths.

The differential analog amplifier 68 is identical in construction and operation to the differential analog amplifier 52 and includes a capacitance 103 and an amplifier 104. The absolute value generator 70 is constructed and operated in the same manner as the absolute value generator 60. Depending on the polarity, the second derivative signals from the differential analog amplifier 68 are applied either through a diode 109, a resistance 110, an amplifier 111 and a summing resistance 112 to an amplifier 115, or through a line 113 and a summing resistance 114 to the amplifier 115. The output from the amplifier 115 is applied through a resistance 120 to an amplifier 121 in the switching function generator 71. The switching function generator 71 is constructed and operated in a manner similar to the switching function generator 61. The generator 71 includes a bias level potentiometer 122 which is connected between potential sources +V and −V and which is employed to set the switching level. The generator 71 further includes potentiometers 123 and 124, and feedback diodes 125 and 126.

In the operation of the apparatus illustrated in FIG. 4, the scanner 50 scans a graphical representation in a conventional manner and provides an output video signal. The video signal is applied to the preamplifier 51 which amplifies the signal to provide a viedo signal which may be of the nature of that illustrated in FIG. 2A or FIG. 3A. This video signal is applied to the differential analog amplifier 52 which generates the first derivative of the video signal, and the first derivative may be of the nature of the signal illustrated in FIG. 2B or FIG. 3B. The first derivative signal is applied to the absolute value generator 60 which supplies at the output of the amplifier 85 the absolute value of the first derivative. This output may be similar to the signal shown in FIG. 2D or FIG. 3D. The output of the generator 60 is applied to the switching function generator 61 which generates an output signal having a fixed magnitude and width in response to each absolute value signal corresponding to each first derivative of the video signal.

The differential analog amplifier 68 generates the second derivative of the video signal, and the output of the amplifier 68 may be of the nature of the signal illustrated in FIG. 2C or FIG. 3C. The second derivative is applied to the absolute value generator 70 which supplies the absolute value of the second derivative to the switching function generator 71. The absolute value of the second derivative may be of the nature of that shown in FIG. 2E or FIG. 3E. The generator 71 operates in the same manner as the generator 61, and provides output signals of a fixed magnitude and width in response to the absolute value signals respectively corresponding to the second derivatives of the video signal. The outputs from the generators 61 and 71 are applied to the gate 62 which provides an output signal of fixed magnitude and width when the absolute value of the first derivative is greater than zero and the absolute value of the second derivative is nearly zero.

The signals from the gate 62 are amplified by the amplifier 74 and applied to the recorder 75 which in turn provides indicia upon the occurrence of each signal from the amplifier 74. The resulting record produced by the recorder 75 after an object, clouds, an image, a photograph, etc., is scanned is a black and white plot including lines indicative of the boundaries between black and white areas as well as lines indicating the changes in grey areas. It should be noted that the amplifier 74 may be a considerable distance from the recorder 75. Although the output from the amplifier 74 may be applied directly to the recorder by hard link (wire), it is preferable to employ the output of the amplifier 74 to modulate a carrier (may be an audio frequency carrier) and transmit this signal by hard link or electromagnetic wave transmission (such as radio) to the recorder 75. Such operations are well known to those skilled in the art, and the particular manner of transmitting the processed video signals (at the output of the amplifier 74) to the recorder does not form a part of the present invention.

It now should be apparent that the present invention provides a method and apparatus for processing video information indicative of a range of grey shades, minor details, etc., as well as light and dark shades in a form more susceptible of transmission without loss of the indicia of the significant changes in grey shades, minor details, etc. It will be understood that although an exemplary analog apparatus for practicing the concepts of the present invention has been disclosed and discussed, other arrangements, particularly digital apparatus, are possible and that the apparatus disclosed may be subjected to various changes, modifications and substitutions without necessarily departing from the spirit of the invention.

What is claimed is:

1. A data processing apparatus for processing first signals indicative of changes in shades of grey as well as light and dark shades of an image comprising a first means for producing said first signals, a recorder for recording indicia representing said first signals, said recorder being synchronized with said first means, the improvement comprising second means responsive to said first signals for generating the first derivative of said first signals, third means connected with said second means for computing the absolute value of said first derivative and providing second signals, fourth means connected with said third means and responsive to the second signals for producing third signals having a fixed magnitude and width, fifth means connected with said second means for generating the second derivative of said first signals, sixth means connected with said fifth means for computing the absolute value of said second derivative and providing fourth signals, seventh means connected with said sixth means and responsive to the fourth signals for producing fifth signals having a fixed magnitude and width, and eighth means responsive to the respective third and fifth signals from said fourth and seventh means to provide output signals to said recorder.

2. The apparatus as defined in claim 1 wherein said eighth means includes a logic gate which provides an output signal when the absolute value of said first derivative is greater than zero and the absolute value of said second derivative is nearly zero.

3. A method for processing signals indicative of the changes in density of areas scanned by a scanner to control a recorder which provides indicia of said areas, the steps comprising generating the first derivative of said signals, computing the absolute value of said first derivative, generating a first switching function in response to the absolute value of said first derivative, generating the second derivative of said signals,
computing the absolute value of said second derivative,
generating a second switching function in response to the absolute value of said second derivative,
logicaly combining said first and second switching functions to determine the points of inflection of said signals, and
generating an output signal in response to each point of inflection of said signals.

4. A method for processing video signals indicative of changes in density to control a recorder which provides indicia of said changes in density, the steps comprising
generating the first derivative of said video signals to produce first signals,
computing the absolute value of said first signals to produce second signals,
generating a first switching function in response to said second signals to produce third signals,
generating the second derivative of said video signals to produce fourth signals,
computing the absolute value of said fourth signals to produce fifth signals,
generating a second switching function in response to said fifth signals to provide sixth signals,
logically combining said third and sixth signals to determine the points of inflection of said video signals to produce output signals for controlling said recorder.

5. An apparatus for processing video signals including a recorder for recording indicia representing at least certain characteristics of said video signals, the improvement comprising
a first means for generating the first derivative of said video signals,
a second means connected with said first means and responsive to the first derivative of said video signals for producing first binary signals,
third means connected with said first means for generating the second derivative of said video signals,
fourth means connected with said third means and responsive to the second derivative of said video signals for producing second binary signals, and
fifth means connected with said second and fourth means and responsive to the first and second binary signals to apply output signals to said recorder.

6. An apparatus for processing video signals indicative of changes in shades of grey as well as light and dark shades of an image comprising a first means responsive to said changes in shades of grey and light and dark shades for producing said video signals, a recorder for recording indicia of said video signals, said recorder being synchronized with said first means, the improvement comprising
a computing means responsive to said video signals for determining the points of inflection of said video signals and providing fixed amplitude output signals, said points of inflection being defined as the points where the absolute values of the first derivatives of the video signals are greater than zero and the absolute values of the second derivatives of the video signals are nearly zero, and
second means connected with said computing means and said recorder for supplying said output signals to control said recorder.

7. A data processing apparatus for processing first signals indicative of changes in shades of gray as well as light and dark shades of an image including a first means for producing said first signals, the improvement comprising
second means responsive to said first signals for generating the first derivative of said first signals,
third means connected with said second means for computing the absolute value of said first derivative and providing second signals,
fourth means connected with said third means and responsive to the second signals for producing third signals having a fixed magnitude and width,
fifth means connected with said second means for generating the second derivative of said first signals,
sixth means connected with said fifth means for computing the absolute value of said second derivative and providing fourth signals,
seventh means connected with said sixth means and responsive to the fourth signals for producing fifth signals having a fixed magnitude and width, and
eighth means responsive to the respective third and fifth signals from said fourth and seventh means to provide output signals.

8. The apparatus as defined in claim 7 wherein
said eighth means includes a logic gate which provides an output signal when the absolute value of said first derivative is greater than zero and the absolute value of said second derivative is substantially zero.

9. An apparatus for processing analog signals and for producing output signals representing at least certain characteristics of said analog signals, the improvement comprising
a first means for generating the first derivative of said analog signals,
a second means connected with said first means and responsive to the first derivative of said analog signals for producing first binary signals,
third means connected with said first means for generating the second derivative of said analog signals,
fourth means connected with said third means and responsive to the second derivative of said analog signals for producing second binary signals, and
fifth means connected with said second and fourth means and responsive to the first and second binary signals for producing output signals representing at least certain characteristics of said analog signals.

10. An apparatus for processing analog signals indicative of changes in shades of gray as well as light and dark shades of an image comprising a first means responsive to said changes in shades of gray and light and dark shades for producing said analog signals, the improvement comprising
first means responsive to said analog signals for determining the absolute values of the first derivatives of said analog signals,
second means responsive to said analog signals for determining the absolute values of the second derivatives of said analog signals, and
third means connected with said first and second means for producing output signals when the absolute values of the first derivatives of said analog signals are greater than zero and the absolute values of the second derivatives of the analog signals are substantially zero.

11. An apparatus as in claim 10 including
a recorder connected with said third means for receiving said output signals, said recorder being synchronized with said first means.

12. A method for processing time variable video signals indicative of changes in light intensity comprising the steps of
selecting the points of inflection of said video signals as a function of time, and
producing fixed amplitude binary signals as a function of time in response to said points of inflection.

13. A method of processing analog video signals which are variable with time comprising the steps of
scanning a representation and producing signals as a function of time and light intensity,
selecting the points of inflection of said signals as a function of time,
producing fixed amplitude binary signals as a function of time in response to said points of inflection, and recording said binary signals as a function of time.

References Cited by the Examiner

UNITED STATES PATENTS

| | | | |
|---|---|---|---|
| 1,661,167 | 3/1928 | Clark et al. | 178—6.7 |
| 1,895,531 | 1/1933 | Weaver | 178—6.7 |
| 2,947,808 | 8/1960 | Allen, Jr. | 178—6.6 |

OTHER REFERENCES

Bell System Technical Journal, July 1959, vol. 38, No. 4, New York, The American Telephone and Telegraph Company, TK 1 B435, pages 1001–1020.

DAVID G. REDINBAUGH, *Primary Examiner.*

RAY LAKE, *Examiner.*

H. W. BRITTON, *Assistant Examiner.*